United States Patent [19]

Gram

[11] Patent Number: 5,760,768

[45] Date of Patent: Jun. 2, 1998

[54] METHOD AND SYSTEM FOR CUSTOMIZING A USER INTERFACE IN A COMPUTER SYSTEM

[75] Inventor: Raymond Douglas Gram, Issaquah, Wash.

[73] Assignee: Microsoft Corporation, Redmond, Wash.

[ * ] Notice: The term of this patent shall not extend beyond the expiration date of Pat. No. 5,287,514.

[21] Appl. No.: 167,573

[22] Filed: Dec. 14, 1993

Related U.S. Application Data

[63] Continuation of Ser. No. 819,194, Jan. 10, 1992, Pat. No. 5,287,514, which is a continuation of Ser. No. 461,775, Jan. 8, 1990, abandoned.

[51] Int. Cl.$^6$ .................................................. G06F 3/00
[52] U.S. Cl. .................. 345/333; 345/334; 345/352; 364/237.2; 364/948.2
[58] Field of Search .......................... 395/700, 167, 395/800; 345/333, 334, 352; 364/237.2, 948.2

[56] References Cited

U.S. PATENT DOCUMENTS

| | | | |
|---|---|---|---|
| 4,680,729 | 7/1987 | Steinhart | 364/900 |
| 4,692,858 | 9/1987 | Redford et al. | 364/200 |
| 5,041,967 | 8/1991 | Ephrath et al. | 364/200 |
| 5,115,501 | 5/1992 | Kerr | 395/600 |
| 5,220,675 | 6/1993 | Padawer et al. | 395/800 |
| 5,261,042 | 11/1993 | Brandt | 395/156 |
| 5,287,514 | 2/1994 | Gram | 395/700 |

OTHER PUBLICATIONS

Microsoft Works Reference. Microsoft Corporation, 1989, pp. 369-382.

*Primary Examiner*—Lucien U. Toplu
*Assistant Examiner*—Majid A. Banankhah
*Attorney, Agent, or Firm*—Jones & Askew, LLP

[57] ABSTRACT

Methods for allowing a user to customize an interface for a computer program are provided. The methods allow a user of the computer program flexibility in organizing commands into a menu structure. The methods also allow a user of a computer program to assign a keystroke sequence to a command. The user can then invoke the command by entering the keystroke sequence. A command assigned to a keystroke sequence does not need to be associated with a menu. The methods allow the user of a computer program to predefine parameters for commands. The predefinition allows the user to invoke a command without reentering the parameters. In a preferred embodiments, the methods use a command array that contains an entry for each command. The methods use an array associated with each menu. The arrays contain unique identifiers of the commands that are associated with the menu. These unique identifiers are used to reference entries into the command array. The entries in the command array include a reference to the program code that implements the commands.

11 Claims, 9 Drawing Sheets

METHOD AND SYSTEM FOR CUSTOMIZING A USER INTERFACE IN A COMPUTER SYSTEM

CROSS-REFERENCE TO RELATED APPLICATION

This application is a continuation of U.S. patent application Ser. No. 07/819,194, filed Jan. 10, 1992 for METHOD AND SYSTEM FOR CUSTOMIZING A USER INTERFACE IN A COMPUTER SYSTEM, now U.S. Pat. No. 5,287,514, which was a continuation of prior application Ser. No. 07/461,775, filed Jan. 8, 1990 for METHOD AND SYSTEM FOR CUSTOMIZING A USER INTERFACE IN A COMPUTER SYSTEM, now abandoned.

FIELD OF THE INVENTION

This invention relates to the field of computer systems and more specifically relates to a method and system for optimizing a menu driven computer user interface for the needs of individual users.

BACKGROUND OF THE INVENTION

Computer system design has recently progressed wherein a large amount of effort has been devoted to improving the ease of using computer systems. One aspect of computer utilization where this is especially evident is in the area of computer user interfaces. For example, the use of windows, icons and pull-down, poop-up, or tear-off menus greatly enhance the ease of using a computer system. For example, pull-down menus often contain commands which are logically grouped so that specific commands may be located and executed quickly. While application programmers strive to arrange pull-down menus in a logical and efficient manner, the specific organization of pull-down menus may not be desirable to many users. Furthermore, in addition to executing commands through pull-down menus, many application programs provide keyboard equivalents for executing certain commands. Since keyboard equivalents may differ from application program to application program, the keyboard equivalents provided by application programmers for one application may often confuse many users accustomed to executing another application program.

One computer system which makes extensive use of pull-down menus and keyboard equivalents is the Macintosh computer system manufactured by Apple Computer, Inc. In the Macintosh operating system, a mechanism is provided wherein plurality of pull-down menus may be used at the operating system level or by application programs. In this system, each individual menu and each menu command is defined by embedded computer code which is compiled at the time of creating a program or whenever updating the computer operating system. In order to modify any menu in this system, the corresponding menu code must be rewritten and recompiled. Thus, it is essentially impossible for users to modify these menus while executing an application program or when using the system for even basic operations.

One popular application program which also makes extensive use of pull-down menus is the Macintosh version of the Microsoft Word word processing application program, available from Microsoft, Inc. Early versions of Microsoft Word provided some flexibility in configuring menus items and associated keyboard equivalents. Specifically, in early versions of Microsoft Word, users were provided with the option of either displaying or hiding items or commands in specific menus. However, it provided no mechanism to modify in which specific menu commands are displayed, to modify the mapping between keystrokes and command or menu items.

Furthermore, while various macro recorders for computer systems allow users to record specific actions such as selecting certain menu items or executing a specific series of keystrokes by invoking those actions with a keystroke, the use of macro recorders is limited to commands which appear on menus or dialog boxes and does within application programs. At the same time, currently available macro recorders are not typically fully integrated within an application program, and functions implemented with macro recorders require several additional steps to initiate a desired function.

No computer system or application program user interface is known which allows a user to fully configure a plurality of menus wherein virtually any command available to a user may be assigned to any menu in the system and further wherein virtually any keystroke or sequence of keystrokes may be assigned to execute virtually any command without the need for exiting an application program currently in use. The present invention further provides a method and system for allowing users to create custom commands and assign those commands to any menu available in the system and assign virtually any keystroke or sequence of keystrokes for executing a user defined custom command.

SUMMARY AND OBJECTS OF THE INVENTION

Briefly described, the present invention contemplates a method and system wherein a plurality of system commands may be assigned to any of a plurality of pull-down menus and further wherein any sequence of keystrokes may be assigned to execute any of the system commands. The present invention contemplates the use of a plurality of arrays wherein a first array stores data structures which define available fixed system commands. In addition, a plex is provided for storing data structures which define user definable system commands. A plurality of menus are provided for disposing the system commands wherein a plurality of menu arrays disposed in parallel with the menus store pointers which link the displayed menu commands to data structures located in either the first array or the plex. All available system commands are stored in an array of executable command wherein pointers in the data structures in the first array link the data structure to a particular executable command. Thus, executing a fixed system command merely requires accessing the appropriate data structures based on a value in the menu array and calling the appropriate command based on a value stored in the data structure. In the case of user-defined commands, the value stored in the menu array points to a location in the plex wherein the data structure in the plex is combined with a data structure in the first array to create a composite data structure which is then used when invoking an executable command string. According to the principles of the present invention, means are provided for associating virtually any menu command with virtually any menu in the system and for associating keystroke sequences with virtually any menu command.

Accordingly, it is an object of the present invention to provide a method and system for customizing an application program or computer system user interface to the needs of to an individual user's requirements.

It is another object of the present invention to provide a method and system for providing flexibility in ustomizing a computer user interface.

It is still another object of the present invention to allow a user of a computer system to select and display frequently used or desired commands on any menu in a menu driven computer environment without the need for leaving a currently executing program.

It is another object of the present invention to provide a method and system for providing flexibility in customizing a computer user interface without the need for recompiling computer code to achieve a desired menu organization.

BRIEF DESCRIPTION OF THE DRAWINGS

These and other objects may be fully understood through the detailed description of the invention below and the accompanying drawings in which.

DETAILED DESCRIPTION OF THE INVENTION

The present invention provides a method and system wherein any of a number of system or program commands may be assigned to any of a number pull-down, pop-up, or tear-off menus and further wherein any of a number of user defined keystrokes may be associated with the system or program commands without resorting to an external utility for recording and executing commands and without ever leaving an operating application or utility program. While the present invention is primarily adapted for use with pull-down or tear-off menus, those skilled in the art will appreciate that the principles of the present invention may be applied to virtually any type of menu driven computer system. Furthermore, while the present invention is disclosed in the environment of an application program, those skilled in the art will appreciate that the principles disclosed herein may be applied to virtually any menu driven computer user interface. A list of terms which are used throughout the detailed description of the invention below is set forth in Appendix 1.

Figure 9:
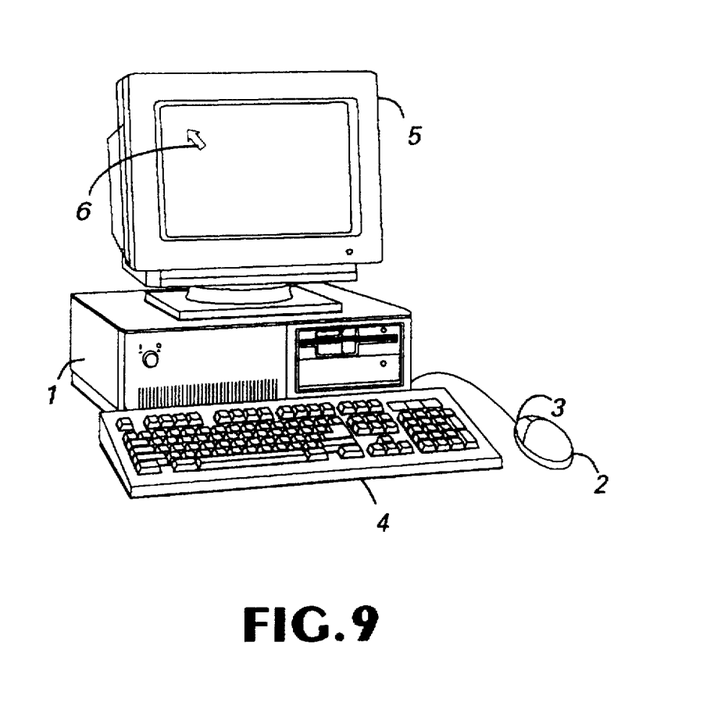

Referring to FIG. 9, a computer system comprises a CPU 1, a mouse input device 2 including a control input button 3, a keyboard 4, and a display screen 5. The control button 3 actuates a contact switch to generate selection signals and other commands. In the preferred embodiment of the present invention, the components of the computer system are used to execute application program code to implement the methods of the present invention described below.

Those of ordinary skill in the art will understand that other system architectures can be used to implement the methods of the present invention described below, including, but not limited to, a local area network in which several computers are coupled with file servers to share access to data among computer users through a data communications network.

Figure 1:
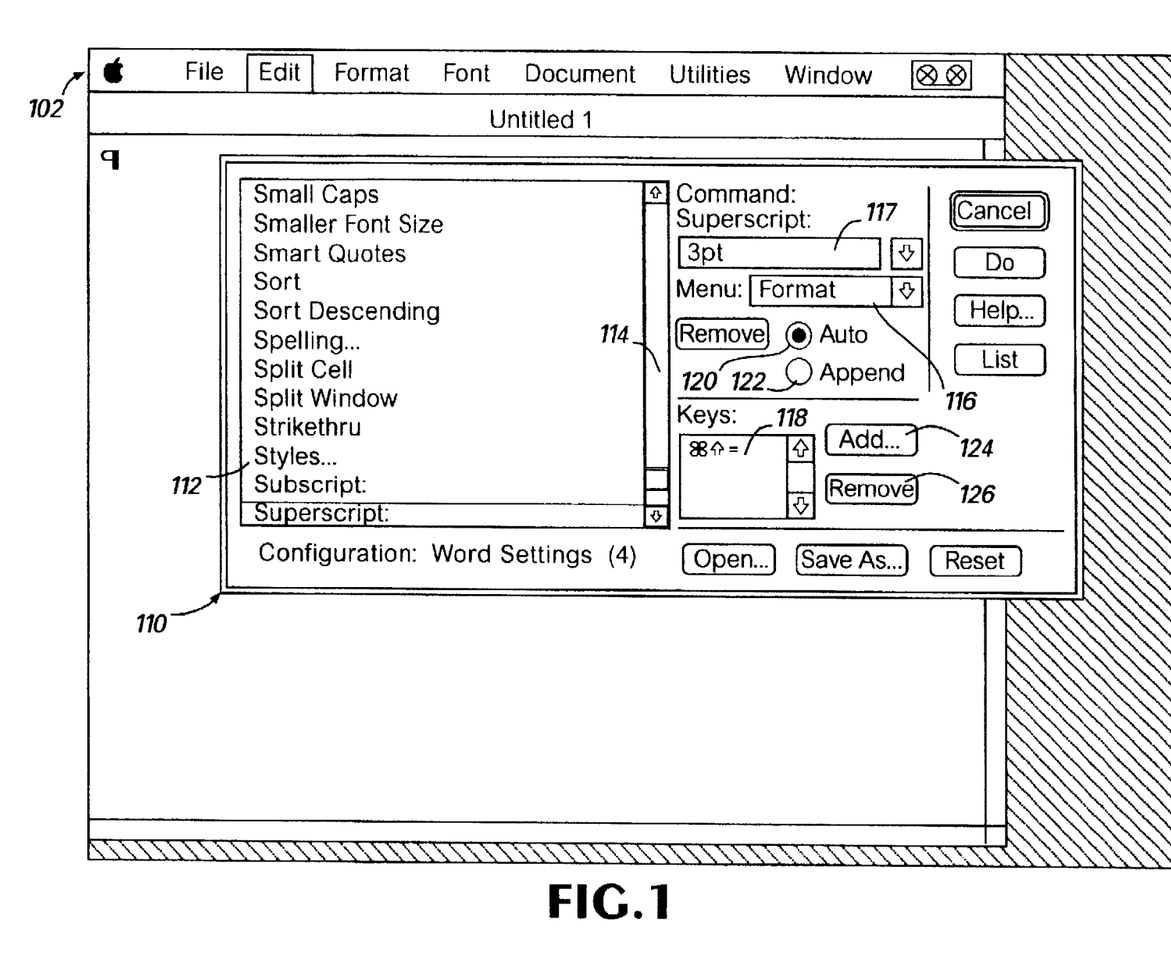
FIG. 1 is a diagram of a computer display window and dialog box displayed to a user when invoking the menu configuration feature of the present invention.

Referring now to FIG. 1, one application of the present invention is adapted for use with the well known Apple Macintosh version of the Microsoft Word word processing program. The well known Apple Macintosh user interface includes a menu bar 102 which includes a plurality of menu headings, each of which are used to display a variety of commands which vary depending on which application program is currently executing. In other words, while the Macintosh operating environment provides the basic routines for drawing, displaying and receiving user inputs through menus, each application program used in the Macintosh operating environment, controls which menu categories are displayed in menu bar 102. The operation and structure of the conventional menu system employed in the Macintosh operating environment is disclosed in at series of texts entitled "Inside Macintosh, Vols. 1–5" published by Addison Wesley, copyright 1985–1988.

As will be further discussed below, each of the menu categories contain a plurality of items or commands which are logically grouped according to function. In the Microsoft Word work processing program, menu bar 102 typically displays the menu categories "File", "Edit", "Format", "Font", "Document", "Utilities", "Window", and "Work"; wherein menu items in the "File" menu may include various file commands such as "open" and "save"; wherein menu items in the "Edit" menu may include various editing commands such as "copy" and "cut"; wherein menu items in the "Format" menu may include various format commands such as "bold" and "underline." Other examples of menu commands typically used in conjunction with the Microsoft Word word processing program may be found in the Microsoft Word Users Guide available from the Microsoft Corporation, One Microsoft Way, Redmond, Wash. 98052-6399. In addition, there are numerous other well known application programs and computer systems which may make use of menu bars and pull-down menus in accordance with the principles of the present invention.

In addition to the use of pull-down menus, the present invention contemplates the use of dialog boxes for receiving and processing user input information although virtually any input technique would function satisfactorily. For example, dialog box 110 is displayed to a user whenever the menu customization system of the present invention is invoked.

The dialog box 110 includes a display area 112 which is used to display all of the predefined commands available in the system. A scroll bar 114 is preferably used to access commands which are not currently visible. Menu area 116 is used to receive user input to select which menu a desired command will be added to or removed from, and menu area 117 is used to receive user input as to command modifiers such as point offsets, etc. In addition, display area 118 is used to display and receive information to select which key sequence is currently or will be associated with a selected menu command. Dialog box 110 also contains a plurality of "buttons" 120–126 wherein a user instructs which specific actions to perform on selected menu items or key sequence. For example, if a currently selected key sequence is not contained in any menu, button 124 will display the "add" option. If a currently selected command is contained in a menu, button 126 will display the "remove" option. Those skilled in the art will readily appreciate that various options in the Macintosh operating environment may be selected with the well known "point and click" technique using an cursor control device such as a mouse. Buttons 120, 122 are used to instruct the system of the present invention whether to append the custom menu item or add it to a desired location. Similarly, buttons 124, 126 are used to add or remove a predefined key sequence from association with a selected command.

Figure 2A:
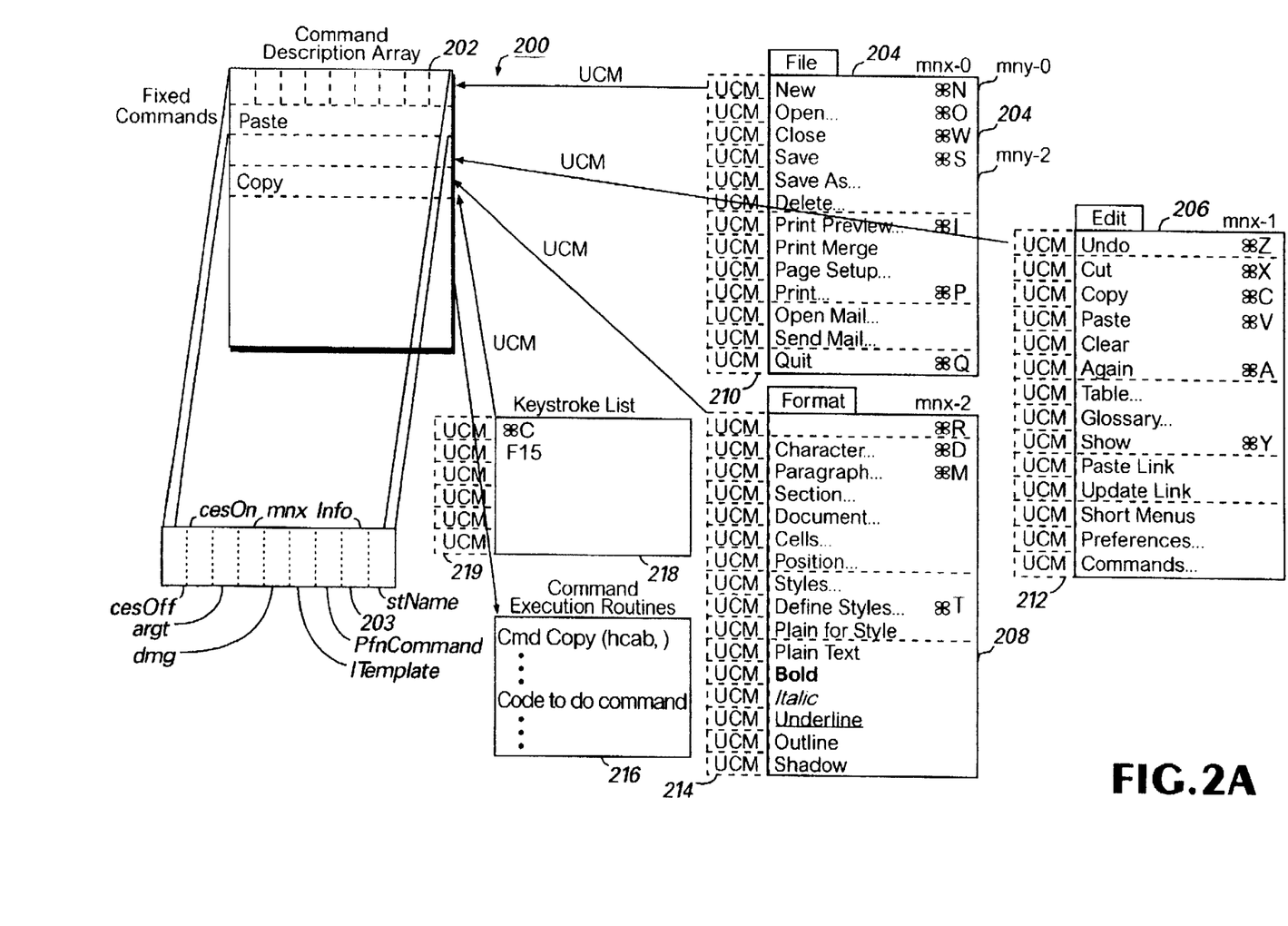
FIG. 2A is a diagram detailing examples of typical menu entries and associated data structures which are used for implementing pre-defined commands.

FIG. 2A shows the relationship of several typical menus and associated data structures used to implement the menu customization feature of the present invention. In the typical Macintosh operating environment, menu commands are embedded in computer code which is fixed when a program is compiled. For example, a typical program sequence for calling menus in an application program written for the Macintosh operating environment is set forth below:

```
Switch (mnx)
case mnx File:
    Switch (mny)
    case mny Copy;
        Do Copy( )
        break
    case mny Paste:
        Do Paste( )
        break
    /*stc*/
    case mnx Edit
    /*stc*/
where: File and Edit are menu headings; and
       Copy and Paste are menu commands or items
```

In contrast, the system 200 contemplates the use of "command well" or command array 202 which allows a user to assign commands to menus items and key stroke combinations to commands with complete freedom. This feature is based on a structure which provides that all commands may be invoked by calling a routine which adheres to a common calling sequence. All commands are then described a structure which indicates under what circumstances the command can be invoked, the name of the command and some simple variant arguments which are filled in when the call is made. Records for each command are stored in an array which allows commands to be uniquely identified by their position (or index) in that table. This command-identifying index is referred to as a "ucm".

The menus are then described by several ucm arrays, one for each menu. The elements in each menu's array contain the ucm for the associated command. To display the menu item, the necessary information is looked-up based on the ucm and the command name is displayed on the menu. This same information controls which routine is called to invoke the command when a user selects the command from the menu. Similarly, a keymap is an array of elements, one for each key that is actually mapped to a command sequence. Each element in the keymap contains the specific key sequence and the ucm of the command associated with that key sequence.

The present invention contemplates the use of two types of commands. The first type of commands are pre-defined, standard commands such as "Open" a file or "Bold" text. These commands are configured as "fixed" commands since the number of these commands is fixed when the program is compiled. The second type of commands are user-definable which may be variants of the provided fixed commands. The user-definable commands, also referred to as allocated commands, require some user defined data or variant information. Allocated commands are handled in the same manner as fixed commands, except that certain routines are invoked to fetch the command descriptors which describe the variant information.

Referring again to FIG. 2A, each entry in array 202 corresponds to an individual menu item. Each entry in array 202 contains a plurality of fields which define the characteristics of its associated menu item. The data structure of each entry in the array 202 is set forth in Table 1 below:

TABLE 1

| Field Name | Meaning |
|---|---|
| casOff | * Conditions when the command is disabled. |
| casOn | * Conditions required to enable the command. |
| argt | * Argument type for the command. |
| mnoc | * Its default menu. |
| dmg | * Its default menu item group. |
| fTemplate | * Is it a template command. |
| pfnCommand | * Pointer to the command's function |
| Info for command | * One of the following: |
| prt | *   Property modifier for a formatting ucm |
| val | *   General Argument |
| sprm | *   Single Property Modifier, simple format ucm |
| rgval | *   Two word values |
| stName | * The command's name |

The array 202 is an array of data structures, (e.g. data structure 203) each of which describe a fixed command.

Menus 204–208 are examples of typical menus which are available to users while operating the Microsoft Word word processing program. In accordance with the principles of the present invention, each menu is associated with a parallel menu array 210–214 which contains lists of ucm pointers which point to individual data structures in array 202. As noted above, a portion of each data structure in array 202 contains a pointer which points to a location in an array 216 of command execution routines. Therefore, executing a particular command merely requires looking-up the ucm corresponding to a particular command, referencing the data structure in array 202 and executing the command in array 216 pointed to by a command identifier in the data structure in array 202.

In addition, an array of keystroke sequences 218 refers to entries in array 202. Keystroke array 218 also includes a parallel array 220 which contains a list of ucm pointers which point to data structures in array 202, wherein entries in keystroke array 218 refer to a specific command in menus 204–208 both utilize the same ucm pointer value. In accordance with the principles of the present invention, each menu item is identified by a plurality of unique indices designated mnx, mny which correspond to specific menu locations. Specifically, the mnx values correspond to individual menus and the mny values correspond to individual locations within a menu. For example, as shown in FIG. 2A, in menu 204, menu item "Close" is identified by a mnx value of 0 and a mny value of 2.

Figure 2B:
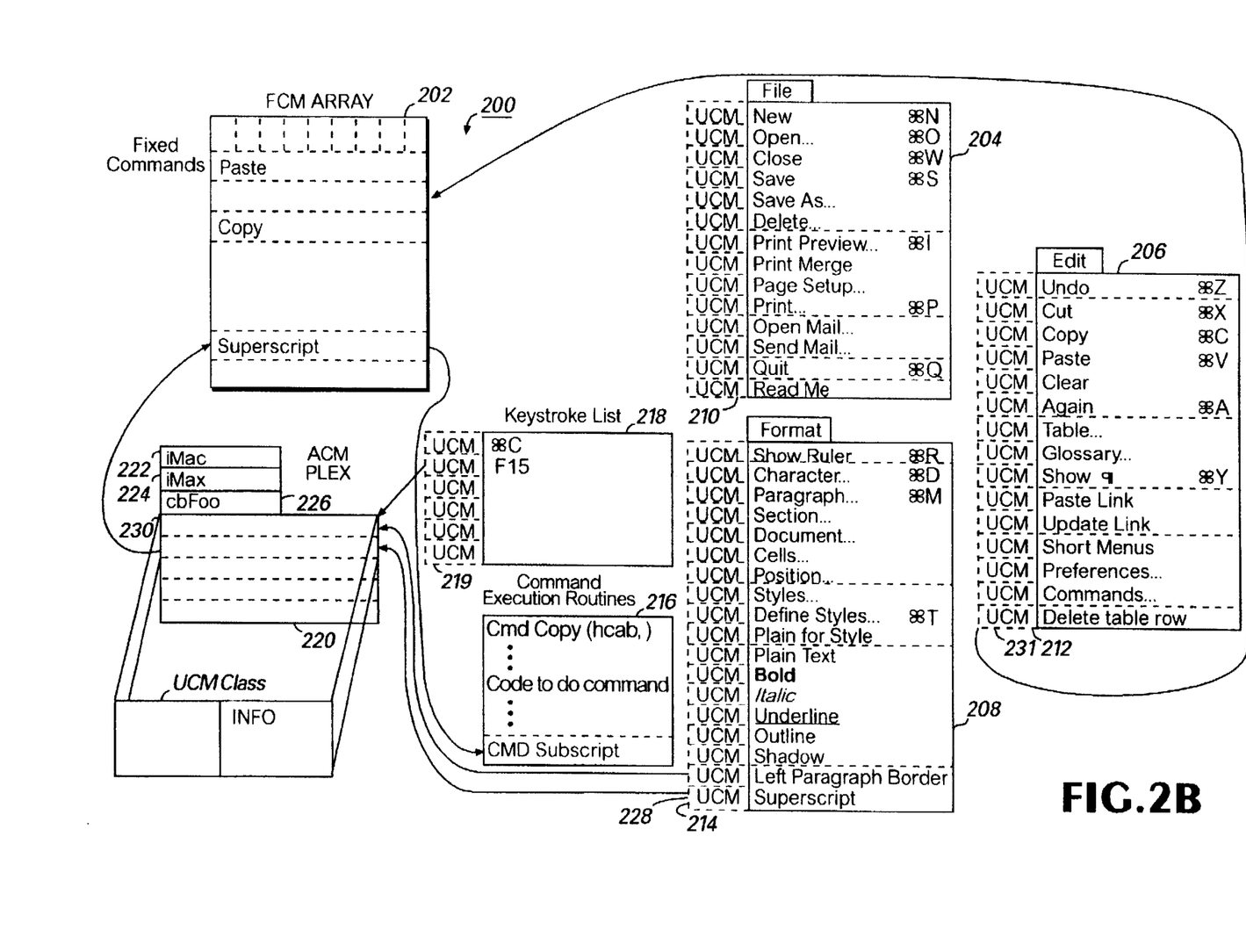
FIG. 2B is a diagram detailing examples of typical menu entries and associated data structures which are used for implementing user defined commands.

Referring now to FIG. 2B, in addition to the fixed command array 202, the present invention contemplates the use of an allocated command (ACM) plex 220 which contains data structures which define user defined commands. In accordance with the principles of the present invention, an ACM plex is a type of array wherein the size of the array is expanded in predetermined increments based on the required number of ACM plex entires. The ACM plex 220 contains a plurality of ACM plex identifiers 222–226 which identify the size of the ACM plex. In FIG. 2B, ACM plex 220 is identified by a variable, iMac, which describes the number of entries currently in use, iMax, which identifies the number of array entries which are allocated, and a value, cbfoo, which describes the size of each ACM plex entry. The data structure entries for ACM plex 220 are set forth in Table 2 below:

TABLE 2

| Field Name | Meaning |
| --- | --- |
| ucmClass | * What sort of command is it? |
| Info for command | * One of the following: |
| prt | * Property modifier for a formatting ucm |
| val | * General Argument |
| sprm | * Single Property Modifier, simple format ucm |
| rgval | * Two word values |

Each ACM plex entry contains variant information which may modify provided fixed commands. In the example shown in FIGS. 2B, the "Superscript" command is shown as added to the "Format" menu. In this example, the "Superscript" ucm 228 points to data structure 230 which contains descriptors such as the number of points by which to offset superscript characters. The contents of ACM plex 220 are combined with the fixed command description in array 202 to generate a composite command information (CMI) data structure which completely describes a user defined menu command. The CMI data structure is set forth in Table 3 below.

TABLE 3

| Field Name | Meaning |
| --- | --- |
| ucm | * The ucm Class |
| fcm | * Command Info |
| cab | * Command Argument block |

Once the CMI data structure is constructed, the composite information is used when invoking the command sequence stored in command array 216. Fixed commands may also be added to any of the menus in the system. For example, the "Delete table row" command is shown as added to the Edit menu 206 wherein ucm 231 points directly to array 202. In addition to the above defined data structures, the data structure of Table 4 is used by the routines below when executing menu commands.

TABLE 4

| Field Name | Meaning |
| --- | --- |
| iagMac | * number of arguments |
| rgag | * array of actual arguments |

Figure 3:
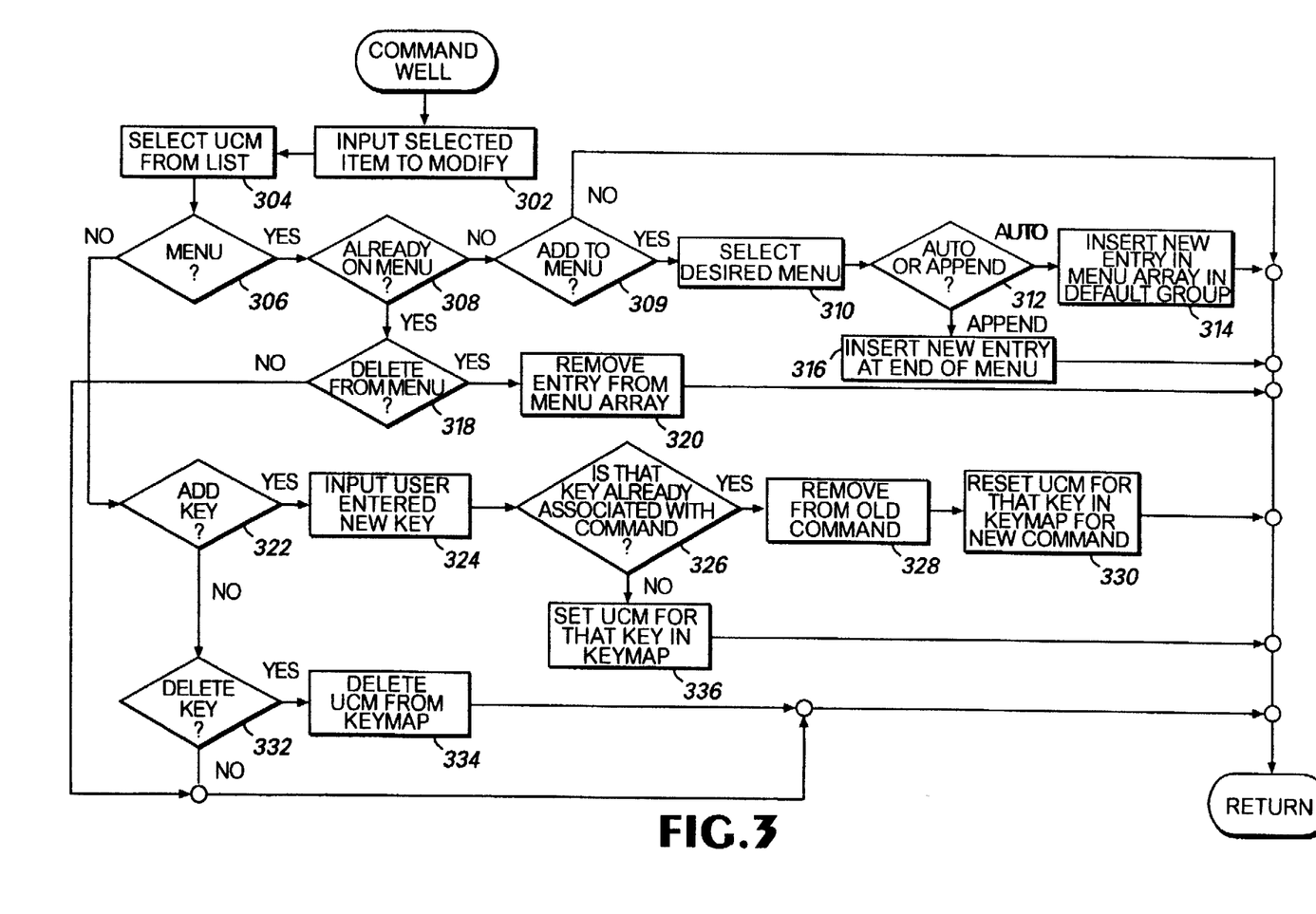
FIG. 3 is a flow diagram detailing the overall operation of the present invention when configuring the user definable menu system of the present invention.

Referring now to FIG. 3, the Command Well routine 300 is invoked whenever a user wishes to modify a menu or key sequence associated with a menu item. A program listing in the well-known 'C' programming language for the Command Well routine 300 is set forth in Appendix 2 below. When invoked, item 302 inputs the user selected item to modify. Item 304 then selects the ucm corresponding to the selected menu item from the list of ucm's. Once the ucm is retrieved, decision 306 determines whether the user wants to modify a menu or key mapping. If a menu command was selected, decision 308 determines whether the selected item already appears on a menu. If not, decision 309 determines whether the user instructed the system to add the selected item to a menu. If not, program control returns. Otherwise, in item 310, the user selects either a default menu or another menu. Once the desired menu is selected, decision 312 determines whether the user selected the auto or append option. If the auto option is selected, item 314 inserts the menu item in its default location. If the append option is selected, item 316 inserts the menu item at the end of the menu. If decision 308 determines a selected item is already on a menu, decision 318 determines whether the selected item is to be deleted from the menu. If not, program control returns. Otherwise, item 320 removes the selected item from the menu array and the routine returns.

If decision 306 determines the user wants to edit a key sequence, decisions 322 and determine whether the add or delete key options were selected. If neither option is selected, the routine returns. If the add option is selected, item 324 inputs the new key or key sequence entered by the user. Decision 326 then determines whether the inputted key or key sequence is already associated with a command. If so, item 328 deletes the ucm reference to the old command and item 330 resets the ucm reference in the keymap to point to the new command. If the key or key sequence is not already associated with a command, item 336 sets the ucm to point to the newly associated command. The routine then returns. If decision 332 determines the delete option was selected, item 334 deletes the ucm from the keymap and the routine then returns.

Figure 4:
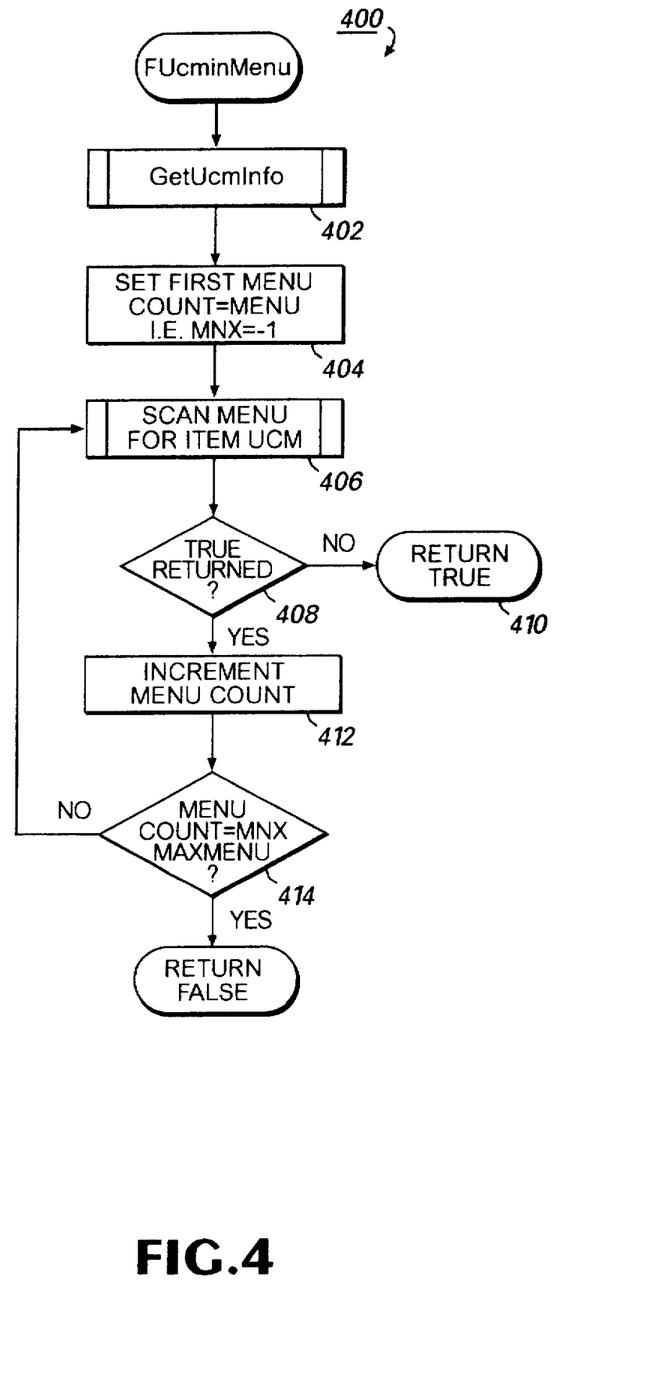
FIG. 4 is a flow diagram of the FUcmInMenu routine which is invoked to determine whether a user selected command is already present in a menu.

Referring now to FIG. 4, the FUcmInMenu routine is invoked to determine whether a particular ucm is located in any menu and it returns either true or false, depending on whether the ucm of interest is found. A program listing in the well know 'C' programming language of the FUcmInMenu routine is set forth in Appendix 3 below. The GetUcmInfo routine 402 is invoked to fetch the composite command information (CMI) describing the command of interest as well as the name of the associated command. Once the command description information is returned, item 404 initializes a program counter to begin sequentially scanning the menus of the system. Those skilled the art will appreciate that this process may be made somewhat faster if the default menu associated with a particular menu is scanned first, followed by the remaining menus. Routine 406 then scans the menu of interest to determine if the command or item of interest is located in the menu of interest. Routine 406 sets a flag either true or false depending on whether the command of interest is found. When routine 406 returns, decision 408 examines the flag to determine whether it has been set to true. If so, the routine 400 returns true. If not, item 412 increments the menu counter to the next menu and decision 414 determines whether the last menu in the system has been scanned, i.e. menu count=MaxMenu. The value of Max-Menu will depend on the actual number of menus used in the system. If the last menu in the in the system has not been scanned, control returns to routine 406. Otherwise, the routine 400 returns false.

Figure 5:
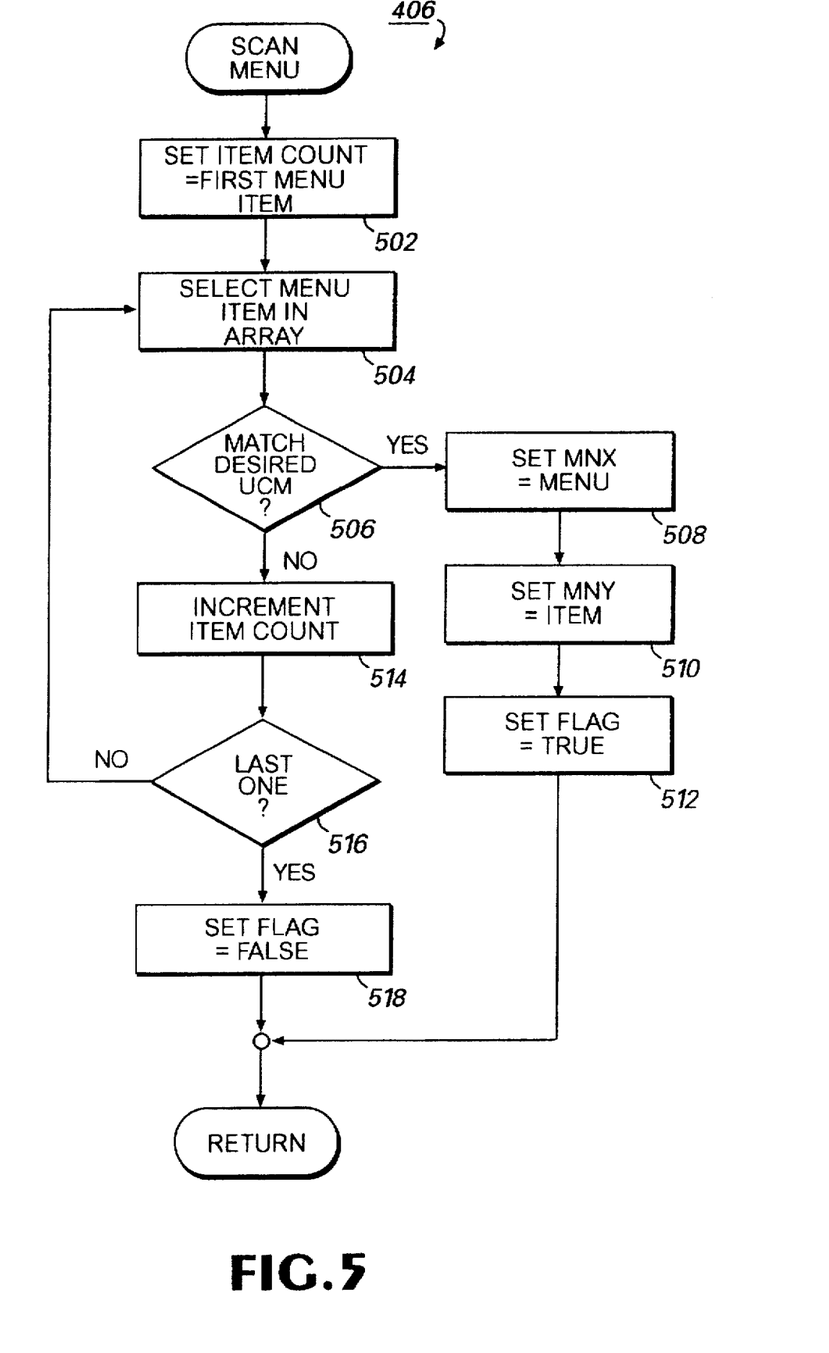
FIG. 5 is a flow diagram of the ScanMenu routine invoked by the routine of FIG. 4.

Referring now to FIG. 5, the ScanMenu routine 406 is invoked by the routine 400. It is used to scan the menu of interest for the item or command of interest. When invoked, item 502 initializes a menu item counter to point to the first item or command in the menu of interest. Item 504 then selects the menu item pointed to by the menu item counter. Decision 506 then determines whether the selected menu command or item matches the desired ucm. If so, the variable mnx is set equal to the menu number. In the preferred practice of the present invention, the mnx variable defines in which menu a particular menu item is located. For example, if eight menus are used in a particular application, mnx will vary from 0–7, wherein 0 is corresponds to the first menu, 1 corresponds the second menu, etc. Item then sets the variable mny equal the menu item number. For example, the variable mny points to the location of an item within a particular menu. If a particular menu has 14 entries, then mny will vary from 0–13. Thus with mnx=2, mny=4, the command or item will be located in menu 3, slot 5, etc. This organization is illustrated in FIGS. 1 and 2A wherein for example, in the Format menu, mnx=3, and the "Document . . ." command is located in slot 5. Once the variables mnx, mny are set, item 512 sets the flag true and the routine returns.

If decision 506 determines a ucm match is not found, item 514 increments the item count and decision 516 determines whether the last item in the menu has been examined. If not, control returns to item 504. Otherwise, item 518 sets the flag equal to false and the routine 406 returns.

Figure 6:
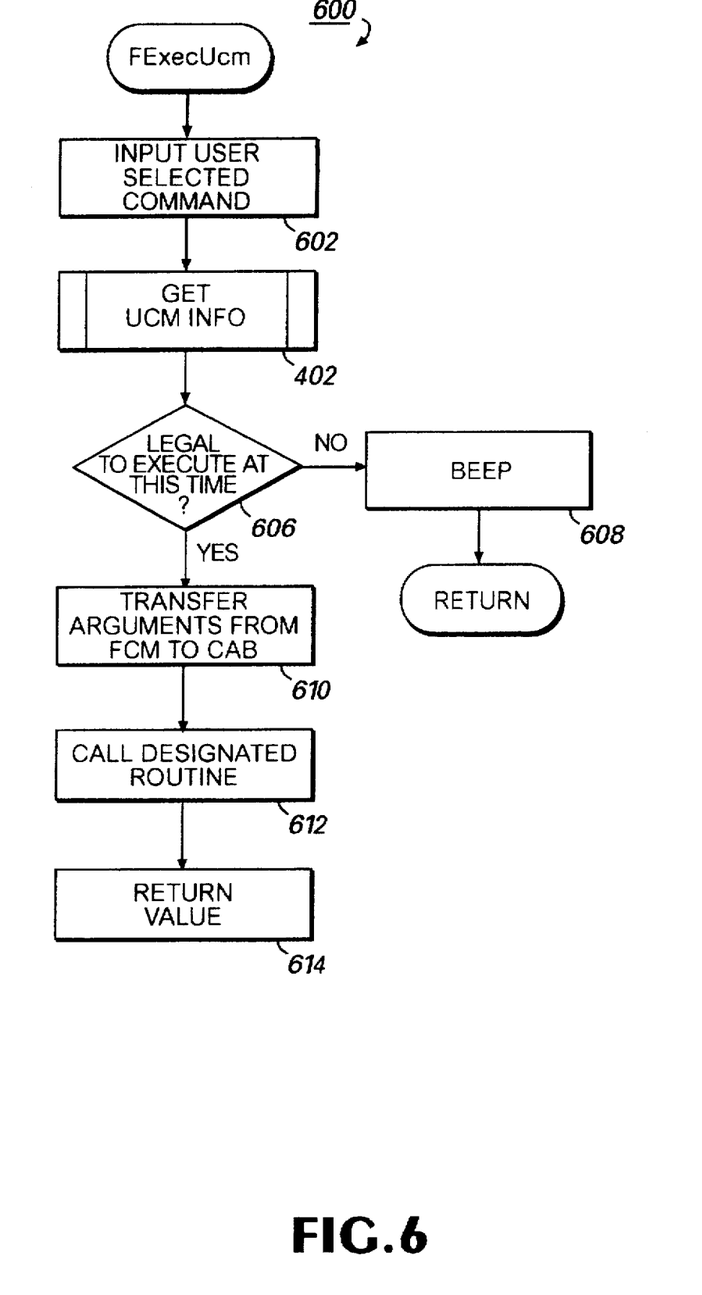
FIG. 6 is a flow diagram of the FExeUcm routine which is invoked to execute a command with a given command identifier.

Referring now to FIG. 6, the FExecUcm routine 600 is invoked whenever a user selects a menu command or item for execution. A program listing in the well known 'C' programming language of the FExecUcm routine is set forth in Appendix 4 below. When invoked, item 602 inputs the user selected command. Routine 402, described above, is then invoked to retrieve the ucm information required for command execution. Decision 606 then determines whether it is legal to execute the selected command. One example of an illegal command is to invoke a "save" command when no document is open. If the selected command is not legal, item 608 returns an error, which in one embodiment of the present invention causes the system to beep. The routine 600 then returns. If the selected command is legal, item 610 transfers the command information in the FCM array to the command action block (CAB) shown in Table 4. Item 612 then calls the routine corresponding to the designated command for execution and item 614 returns and values returned by the executed routine.

Figure 7:
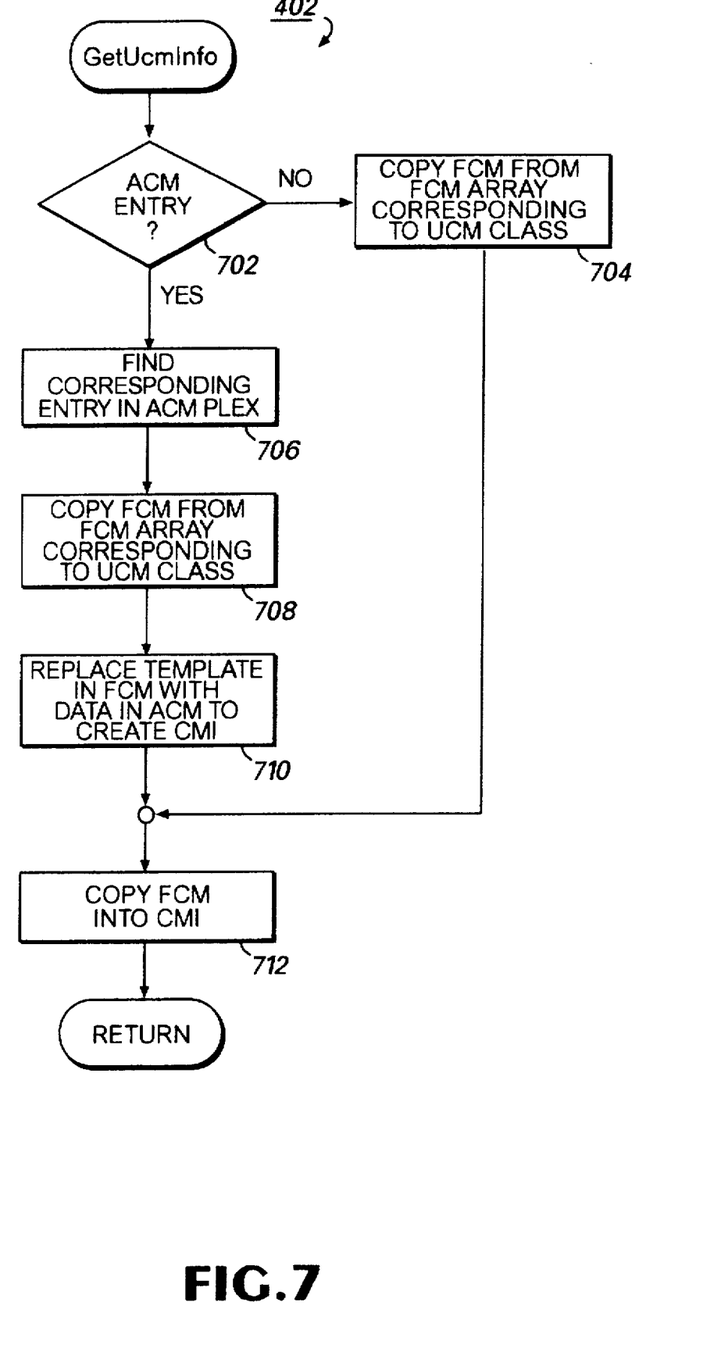
FIG. 7 is a flow diagram of the GetUmInfo routine invoked by the routines of FIGS. 4 and 6.

Referring now to FIG. 7, the GatUcmInfo routine 402 is invoked by the routines 400, 600 to retrieve the ucm informaiton required for ucm processing. A program listing in the well know 'C' programming language of the GetUcmInfo routine is set forth in Appendix 5 below. When invoked, decision 702 determines whether the ucm of interest refers to an ACM entry, indicating it includes user defined information. If not, the ucm corresponds to a fixed command. In this case, item 704 copies the FCM data structure from the FCM array corresponding to the ucm class. Item 712 then copies the FCM data structure into the composite command information data structure and the routine 402 returns.

If the ucm corresponds to a user defined command, item 706 finds the entry in the ACM plex corresponding to the ucm of interest. Item 708 then copies the FCM data structure in the FCM array corresponding to the ucm of interest to a temporary location. Item 710 then replaces a subset of the variables in the FCM data structure with the data stored in the ACM array to create the CMI data structure. The newly created data structure is then copied into the CMI data structure by item 712 and the routine 402 returns.

Figure 8:
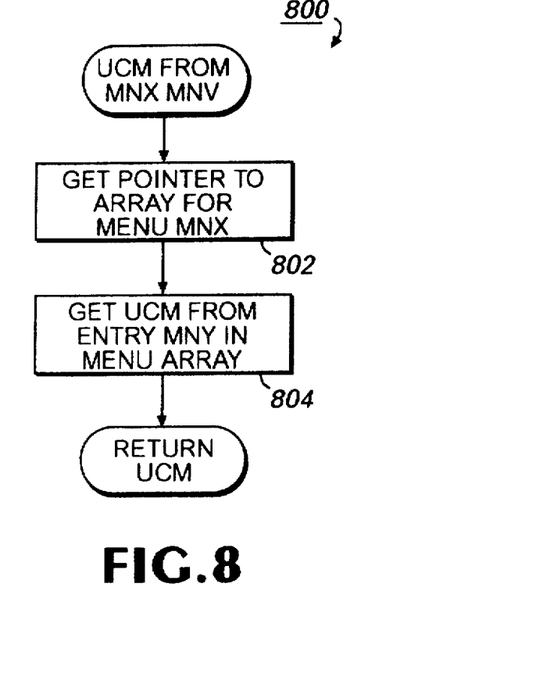
FIG. 8 UcmFromMnxMny routine which invoked to generate command location information whenever a user selects a pull-down menu item.

Referring now to FIG. 8, the UcmFromMnxMny routine is invoked to extract the mnx, mny values for a particular menu item to generate a cmi whenever a user selects a command for execution. A program listing in the well know 'C' programming language for the UcmFromMnxMny routine is set forth in Appendix 6 below. As noted above, the mnx, mny values define a menu and a location within a menu for each command. When invoked, item 802 fetches a pointer to the ucm array based on the mnx value. Item 804 then fetches a pointer to the location within the particular ucm array based on the mny entry in the menu array. The routine 800 then returns the ucm corresponding to the menu command.

In summary, an improved user definable user interface for use with a computer system has been defined. In accordance with the principles of the present system, menu commands may be assigned to virtually any menu in the system and keystroke sequences may be assigned to the menu commands with complete freedom. In another aspect of the present invention, the user interface may be reconfigured without ever leaving an operating application program. Accordingly, other uses and modifications of the present invention will be apparent to persons of ordinary skill and all of such uses are intended to fall within the scope of the appended claims.

APPENDIX 1

ACM: Allocated Command Descriptor. Describes information unique to a command created by the user.

CMI: Composite Command Info, the information needed to completely describe a command. This is composed of information from an FCM and/or a ACM.

FCM: Fixed Command Info, the information associated with a fixed command.

fixed command: A command defined by Word, as opposed to commands created by the user.

MNX: The number identifying a menu. 'X' is used because the menus appear horizontally on a menu bar, so the "mnx" is the "x-coordinate" of that menu.

MNY: The number associated with an item in a specific menu. 'Y' is used because the items appear vertically in menus, so the 'mny' is the 'y-coordinate' of the menu item. An (mnx, mny) pair uniquely identifies a menu item.

PLEX: A variable-length array allocated to the needed size. The data structure, in its simplest form, consists of an integer "iMac" and the array of values. Indices run from 0 to iMac-1. Another field in the record, designated abfoo, describes the size of the entries in the plex.

UCM: An integer index which identifies a command.

mpucmfcm: A global array in Word which uses a UCM as an index into a table of FCMs.

Other data structures used with the present invention are is follows:

CHM=an integer which uniquely identifies a key/modifier combination. One byte is bits which tell which modifiers keys are down, the other byte is the upper case character pressed.

KME=Key Map Entry, simply the chm for the key and its associated ucm.

KMP=Key Map is "ikmeMac"=the number of entries in array of KMEs, "rgkme".

CAB=Command Argument Block is "iagMac"=the number of entries in an array of integers "rgag".

Appendix 2

```
CommandWell( )
{
    ucm = SelectionFromUser( );
    if (WantToModifyMenu)
    {
        if (FUcmOnMenu(ucm, mnx, mny))
        {
            if (NOT WantToDeleteMenuItem)
                (return;
            /* Remove item mny from the item array for menu mnx */
        }
        else
        {
            if (NOT WantToAddMenuItem)
                return;
            /* User wants to add the selected ucm to a menu */
            mnx = MnxFromUcm( ); /* Get the default menu
                                    assignment */
```

Appendix 2-continued

```
        {
            chm = GetKeyFromUser( );
            if(UcmFromChm 1 = ucmNil)
                if(NOT WantToRemoveKeyFromExistingCommand)
                    return;
            /* set ucm into the key map entry for chm */
        else if (WantToRemoveKey)
        {
            chm = SelectKeyFromListForUcm(ucm);
            /* delete the entry for cnm from the KMP */
        }
    }
}
UcmFromChm(ucm)
{
    for(ikme = 1 to kmo.ikmeMac-1)
        if(kmp.rgkme(ikme].chm == chm)
            return kmp.rgkme(ikme].ucm;
    return ucmNil;
}
```

Appendix 3

```
/* Returns true if ucm is on a menu, and if so it return mnx, and mny */
/* the menu number and menu item number, resp. */
FUcminMenu(ucm, mnx, mny)
{
    GetUcmInto(ucm, cmi, stName);
    /* check to see if the command has a default menu, or has been assigned a menu */
    if (cmi.mnx == mnxNil)
        Return tFalse:
    /* scan the default menu for the ucm */
    for (each item on the menu)
        if (mit.ucm == ucm)
        {
            /* set mnx and mny */
            return true;
        }
    /* if that fails, then scan the other menus */
    for (each menu other than the default)
        for (each item on the menu)
            if (mit.ucm == ucm) /* mit is the menu item descriptor */
            {
                /* set mnx and mny */
                return true:
            }
}
/* Determine the ucm (command identifier) associated with */
/* menu item "mny" in the menu mxn */
UcmFromMnxMny(mnx, mny)
{
    return PmenMnx(mnx)->rgmit(mny].ucm;
}
/* Execute a command given its "ucm" command identifier */
```

Appendix 2-continued

```
        if (WarmDifferentMenu)
            mnx = SelectMenuFromUser( );
        /* If the default menu is chosen, and the user wants */
        /* the auto position, calculate the auto position */
        /* Otherwise, tack it on at the end of the menu */
        if (mnx EQ MNXFromUcm AND
            UserWantsAutoItemNumber)
            mny = MnyForDefaultGroup( );
        else
            mny = MnyEndFromMnx(mnx);
        /* Insert the new menu item at position mny in the */
        /* Item array for menu number mnx */
        }
    }
    else if (WantToChangeKeyAssignment)
    {
        if (WantToAddKey)
```

Appendix 4

```
FExecUcm(ucm)
{
    GetUcmInfo(ucm, cmi, stName);
    if (IFlagalCmiCes(cmi,ces)) /* is the command currently legal? */
    {
        Beep ( );
        return tFalse;
    }
    /* prepare arguments for the command based on "cmi.argt" (the argument type) */
    /* this information is stored in a CMB, the command block */
    /* Now, we get the pointer to the command routine from the CMI and call it */
    /* The routine will return the pre-defined value of "cmdOK" if all went well, */
    /* otherwise it will return an error code */
    cmd. = (*cmi.pfnCmd)(cmb);
    return cmd == cmdOK;
}
```

Appendix 5

```
/* Given a "ucm" (command identifier), look up the information describing the command */
/* and return it in the cmi data structure. Also, return the name associated with the command. */
GetUcmInfo(ucm, cmi, pstName)
{
    if (ucm > = ucmiacmMin)
    {
        /* This is an allocated ucm. Get ACM from the PLEX of ACMs. */
        ACM = vhplacm.rgacm[iacm];
        /* Fill in cmi from ACM and mpucmfcm[acm.ucmClass]. */
        cmi.ucm = acm.ucmClass
        cmi.fcm = mpucmtcm(cmi.ucm];
        /* etc. */
    }
    else
    {
        /* This is a fixed ucm, get cmi from mpucmtcm */
        cmi.ucm = ucm;
        cmi.fcm = mpucmtcm(cmi.ucm];
    }
    /* Get name for ucm. Some fixed ucm's Impty their names directly (via tcm.stName). */
    /* Some other ucm's names are composed here and may be based on properties of */
    /* the ucm and the state of the program (type of selection, previous action. etc.) */
    /* By default, the command name is stored in tcm.stName */
}
```

Appendix 6

To execute a menu command, given the "mnx" and "mny", one simply does this:
FExecUcm(UcmFromMnxMny(mnx, mny));

I claim:

1. A method executed in a computer system for customizing a menu of a user interface of a computer program, the method comprising the steps of:

starting execution of the computer program, the computer program having a plurality of menus, having a plurality of commands, each of which performs a function, and having customizing code to implement menu customizing, wherein the customizing code does not execute independently of the execution of the computer program; and during execution of the customizing code,
    selecting one of the plurality of menus,
    selecting one of the plurality of commands; and
    associating the selected command with the selected menu so that after execution of the customizing code the selected command can be chosen from the selected menu to perform the function of the selected command.

2. The method of claim 1, wherein the computer system includes a display device and including the steps of:
after execution of the menu customizing code,
    displaying on the display device an indication that the selected command is associated with the selected menu; and
    in response to a user choosing the displayed indication, performing the function of the selected command.

3. The method as recited in claim 1, wherein the step of associating the selected command with the selected menu further includes the steps of:
    locating a command-identifier for the selected command;
    using the command-identifier to locate the selected command and a plurality of fields associated with the selected command;
    locating a menu indice field within the plurality of fields associated with the selected command;
    determining a menu number associated with the selected menu; and
    setting the menu indice field associated with the selected command equal to the menu number of the selected menu.

4. A computer system for customizing a menu, comprising:
   a display device;
   a central processing unit for executing instructions of the computer system; and
   a memory having instructions
      for starting the execution of a computer program, the computer program having a plurality of menus and a plurality of commands, each of the plurality of the commands for performing a function, the computer program having menu customizing instructions that do not execute independently of the computer program, the menu customizing instructions for selecting one of the plurality of menus, for selecting one of the plurality of commands, and for associating the selected command with the selected menu; and
      for displaying on the display device an indication that the selected command is associated with the selected menu and for performing the function of the selected command in response to a user selection of the displayed indication
      wherein the central processing unit retrieves the instructions from the memory and executes the instructions.

5. A computer-readable memory device for controlling a computer system for performing the steps of claim 1.

6. A computer system for customizing a menu, comprising:
   a display device;
   a processing unit for executing instructions of the computer system; and
   a memory having instructions operative to:
      start the execution of a computer program, the computer program comprising
         a plurality of menus each including an array of command-identifier indexes;
         a plurality of commands for performing functions, each command comprising
            an assigned command-identifier index and
            a plurality of fields, each field including
            a menu indice field; and
         menu customizing instructions that do not execute independently of the computer program, the menu customizing instructions operative to
            select one of the plurality of menus,
            select one of the plurality of commands in the menu, and
            associate the selected command with the selected menu by using its command-identifier index to locate the selected command and correlate the menu indice field within the plurality of fields of the selected command with the selected menu; and
         display on the display device an indication that the selected command is associated with the selected menu and perform the function of the selected command in response to a user selection of the displayed indication,
      wherein the processing unit retrieves the instructions from the memory and executes the instructions.

7. The computer system for customizing a menu as recited in claim 6, wherein the computer program further comprises a command array table; and the menu customizing instructions are further operative to
   associate the selected command using its command-identifier index to locate the selected command in the command array table; and
   correlate the menu indice within the plurality of fields of the selected command with the selected menu so that the selected command can be chosen from the selected menu after execution of the customizing code to perform the function of the selected command.

8. A method executed in a computer system for customizing a menu of a user interface of a computer program, the method comprising the steps of:
   starting execution of the computer program, the computer program comprising:
      a command array table;
      a plurality of commands for performing functions, each command comprising
         an assigned command-identifier index and
         a plurality of fields, each plurality of fields including
         a menu indice field;
      a plurality of menus each having a menu number and each including
         an array of command-identifier indexes correlating to the commands within each menu; and
      customizing code for implementing menu customization during the execution of the computer program;
   and during execution of the customizing code,
      selecting one of the plurality of menus,
      selecting one of the plurality of commands in the menu,
      selecting another one of the plurality of menus; and
      associating the selected command with the other selected menu by using the command-identifier index of the selected command to locate the selected command in the command array table and correlating the menu indice field of the selected command with the other selected menu so that the selected command can be chosen from the other selected menu after execution of the customizing code to perform the function of the selected command.

9. The method as recited in claim 8, wherein the step of associating the selected command with the other selected menu by using the command-identifier index of the selected command to locate the selected command in the command array table and correlating the menu indice field of the selected command with the other selected menu so that the selected command can be chosen from the other selected menu after execution of the customizing code to perform the function of the selected command further includes the steps of:
   locating a menu number associated with the other selected menu;
   locating the menu indice field within the plurality of fields associated with the command-identifier index of the selected command; and
   setting the menu indice field associated with the selected command equal to the menu number of the other selected menu.

10. A method executed in a computer system for customizing a menu of a user interface of a computer program, the method comprising the steps of:
   starting execution of the computer program, the computer program comprising
      a plurality of menus each including an array of command-identifier indexes;
      a plurality of commands for performing functions, each command comprising
         an assigned command-identifier index and
         a plurality of fields, each plurality of fields including
         a menu indice field; and
      customizing code for implementing menu customizing, wherein the customizing code does not execute independently of the execution of the computer program; and during execution of the customizing code,
- selecting one of a plurality of menus,
- selecting one of the plurality of commands; and
- associating the selected command with the selected menu by using the command-identifier index of the selected command to locate the selected command and correlating the menu indice field of the selected command with the selected menu so that the selected command can be chosen from the selected menu after execution of the customizing code to perform the function of the selected command.

11. The method as recited in claim 10, wherein the step of associating the selected command with the selected menu further includes the steps of:

- locating a command-identifier for the selected command;
- using the command-identifier index to locate the selected command and the plurality of fields associated with the selected command;
- locating the menu indice field within the plurality of fields associated with the selected command;
- locating a menu number associated with the selected menu; and
- setting the menu indice field associated with the selected command equal to the menu number of the selected menu.

* * * * *